(12) United States Patent
Yu et al.

(10) Patent No.: US 11,681,779 B1
(45) Date of Patent: Jun. 20, 2023

(54) NOTIFICATION SERVICE SERVER CAPABLE OF PROVIDING ACCESS NOTIFICATION SERVICE TO HARMFUL SITES AND OPERATING METHOD THEREOF

(71) Applicant: FRANKLIN TECHNOLOGY INC., Seoul (KR)

(72) Inventors: Changsoo Yu, Hwaseong-si (KR); Ok Chae Kim, Seoul (KR)

(73) Assignee: FRANKLIN TECHNOLOGY INC., Seoul (KR)

( * ) Notice: Subject to any disclaimer, the term of this patent is extended or adjusted under 35 U.S.C. 154(b) by 0 days.

(21) Appl. No.: 17/918,120

(22) PCT Filed: May 27, 2022

(86) PCT No.: PCT/KR2022/007533
§ 371 (c)(1),
(2) Date: Oct. 11, 2022

(30) Foreign Application Priority Data

Apr. 29, 2022 (KR) .......................... 10-2022-0053642

(51) Int. Cl.
*G06F 18/22* (2023.01)
*G06F 16/951* (2019.01)
*G06F 40/205* (2020.01)
*G06F 16/36* (2019.01)

(52) U.S. Cl.
CPC ............ *G06F 18/22* (2023.01); *G06F 16/367* (2019.01); *G06F 16/951* (2019.01); *G06F 40/205* (2020.01)

(58) Field of Classification Search
None
See application file for complete search history.

(56) References Cited

U.S. PATENT DOCUMENTS

| | | | |
|---|---|---|---|
| 2015/0180746 A1* | 6/2015 | Day, II | H04M 1/72463 455/405 |
| 2018/0196881 A1* | 7/2018 | Lundin | G06F 16/9535 |
| 2021/0374164 A1* | 12/2021 | Ghoula | G06F 18/22 |
| 2021/0382946 A1* | 12/2021 | Beller | G06F 16/906 |
| 2022/0116402 A1* | 4/2022 | Chai | G06Q 50/01 |
| 2022/0121695 A1* | 4/2022 | Zhang | G06F 40/40 |
| 2023/0061341 A1* | 3/2023 | Shmueli | G06F 16/258 |

FOREIGN PATENT DOCUMENTS

| | | |
|---|---|---|
| KR | 10-0472087 B1 | 3/2005 |
| KR | 10-2007-0003495 A | 1/2007 |
| KR | 10-0898771 B1 | 5/2009 |
| KR | 10-1062957 B1 | 9/2011 |
| KR | 10-1739415 B1 | 5/2017 |
| KR | 10-2019-0056946 A | 5/2019 |
| KR | 10-2021-0097408 A | 8/2021 |

* cited by examiner

*Primary Examiner* — Kris E Mackes
*Assistant Examiner* — Soheila (Gina) Davanlou
(74) *Attorney, Agent, or Firm* — Park, Kim & Suh, LLC

(57) ABSTRACT

Disclosed are a notification service server and an operating method thereof. The present invention presents a notification service server capable of providing an access notification service to harmful sites and an operating method thereof to support a manager to prevent a client terminal from accessing a harmful site.

9 Claims, 2 Drawing Sheets

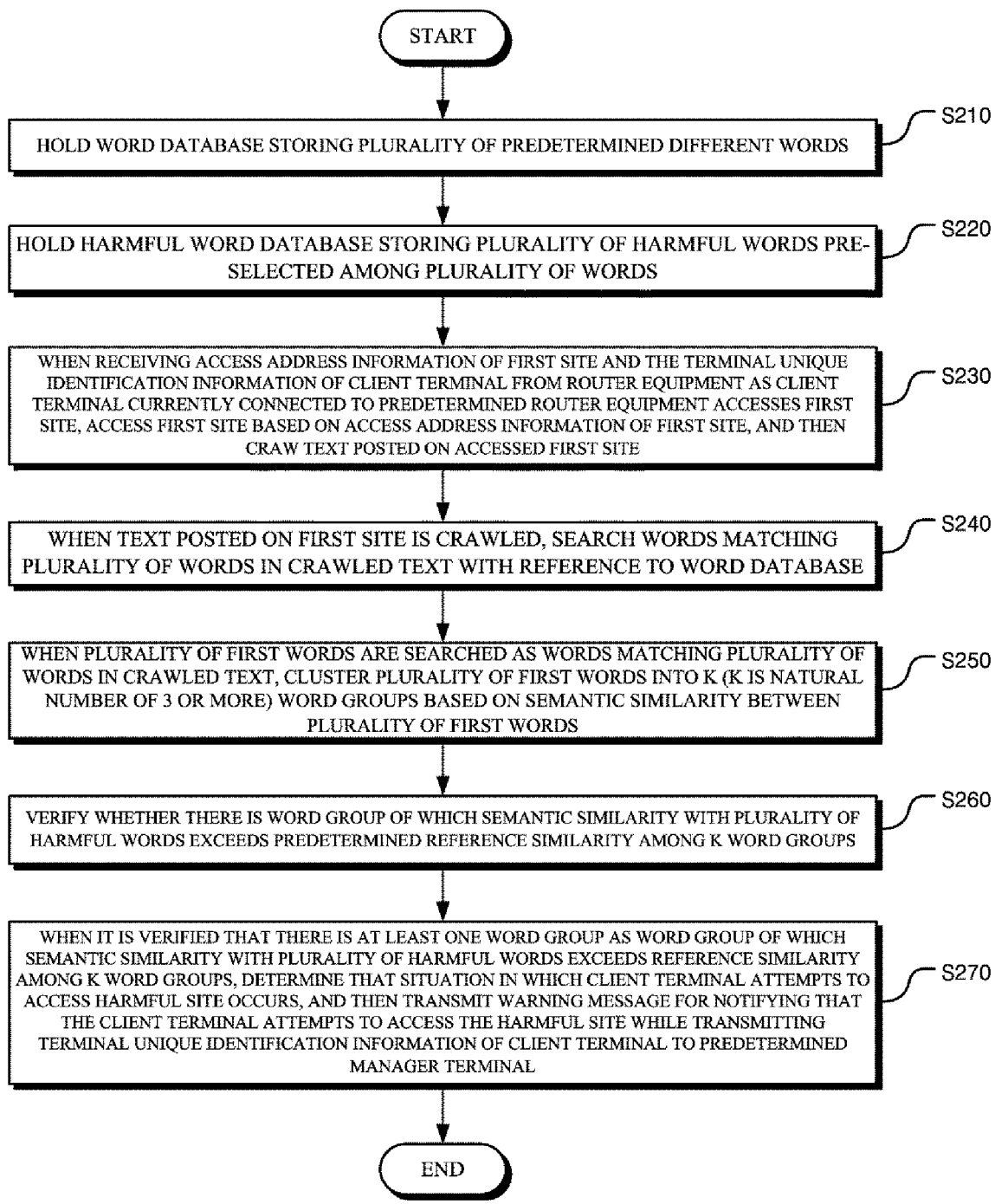

NOTIFICATION SERVICE SERVER CAPABLE OF PROVIDING ACCESS NOTIFICATION SERVICE TO HARMFUL SITES AND OPERATING METHOD THEREOF

CROSS-REFERENCE TO RELATED APPLICATIONS

This application is a National Phase Application of PCT International Application No. PCT/KR2022/007533, which was filed on May 27, 2022, and which claims priority from Korean Patent Application No. 10-2022-0053642 filed on Apr. 29, 2022. The disclosures of the above patent applications are incorporated herein by reference in their entirety.

TECHNICAL FIELD

The present invention relates to a notification service server capable of providing an access notification service to harmful sites and an operating method thereof.

BACKGROUND ART

Recently, as individual Internet use time increases, the need for access blocking of harmful sites is also increasing.

Here, the harmful site means a site containing information that is deemed required for review, such as security risks, gambling, obscenity, illegal drug sales, etc.

On the other hand, when such a harmful site is a phishing site, the user's account information and password may be unintentionally stolen, so it is necessary to prepare countermeasures for prevention.

In this regard, as a client terminal currently connected to router equipment accesses a specific site, when access address information of the specific site is received from the router equipment, the specific site is accessed based on the access address information of the specific site, and then a text posted on the specific site is analyzed, and when it is determined that a predetermined harmful word is included in the analyzed text, if identification information of the client terminal and a warning message for indicating that the client terminal attempts to access the harmful site with the identification information of the client terminal may be transmitted to the manager terminal, a manager will be able to prevent the client terminal to access the harmful site.

Therefore, studying a notification service technology capable of providing an access notification service to harmful sites is required.

DISCLOSURE

Technical Problem

The present invention presents a notification service server capable of providing an access notification service to harmful sites and an operating method thereof to support a manager to prevent a client terminal from accessing a harmful site.

Technical Solution

According to an embodiment of the present invention, a notification service server capable of providing an access notification service to harmful sites includes: a word database storing a plurality of predetermined different words; a harmful word database storing a plurality of harmful words pre-selected among the plurality of words; when receiving access address information of a first site and the terminal unique identification information of the client terminal from router equipment as a client terminal currently connected to predetermined router equipment accesses the first site, a crawling unit accessing the first site based on the access address information of the first site, and then crawling a text posted on the accessed first site; when the text posted on the first site is crawled, a word search unit searching words matching the plurality of words in the crawled text with reference to the word database; when a plurality of first words are searched as the words matching the plurality of words in the crawled text, a clustering unit clustering the plurality of first words into k (k is a natural number of 3 or more) word groups based on a semantic similarity between the plurality of first words; a verification unit verifying whether there is a word group of which semantic similarity with the plurality of harmful words exceeds a predetermined reference similarity among k word groups; and when it is verified that there is at least one word group as the word group of which semantic similarity with the plurality of harmful words exceeds a reference similarity among k word groups, a warning message transmission unit determines that a situation in which the client terminal attempts to access the harmful site occurs, and then transmitting a warning message for notifying that the client terminal attempts to access the harmful site while transmitting the terminal unique identification information of the client terminal to a predetermined manager terminal.

Further, according to an embodiment of the present invention, an operating method of a notification service server capable of providing an access notification service to harmful sites includes: holding a word database storing a plurality of predetermined different words; holding a harmful word database storing a plurality of harmful words pre-selected among the plurality of words; when receiving access address information of a first site and the terminal unique identification information of the client terminal from router equipment as a client terminal currently connected to predetermined router equipment accesses the first site, accessing the first site based on the access address information of the first site, and then crawling a text posted on the accessed first site; when the text posted on the first site is crawled, searching words matching the plurality of words in the crawled text with reference to the word database; when a plurality of first words are searched as the words matching the plurality of words in the crawled text, clustering the plurality of first words into k (k is a natural number of 3 or more) word groups based on a semantic similarity between the plurality of first words; verifying whether there is a word group of which semantic similarity with the plurality of harmful words exceeds a predetermined reference similarity among k word groups; and when it is verified that there is at least one word group as the word group of which semantic similarity with the plurality of harmful words exceeds a reference similarity among k word groups, determining that a situation in which the client terminal attempts to access the harmful site occurs, and then transmitting a warning message for notifying that the client terminal attempts to access the harmful site while transmitting the terminal unique identification information of the client terminal to a predetermined manager terminal.

Advantageous Effects

The present invention presents a notification service server capable of providing an access notification service to harmful sites and an operating method thereof to support a manager to prevent a client terminal from accessing a harmful site.

DESCRIPTION OF DRAWINGS

FIG. 2 is a flowchart illustrating an operating method of a notification service server capable of providing an access notification service to harmful sites according to an embodiment of the present invention.

MODE FOR INVENTION

Figure 1:
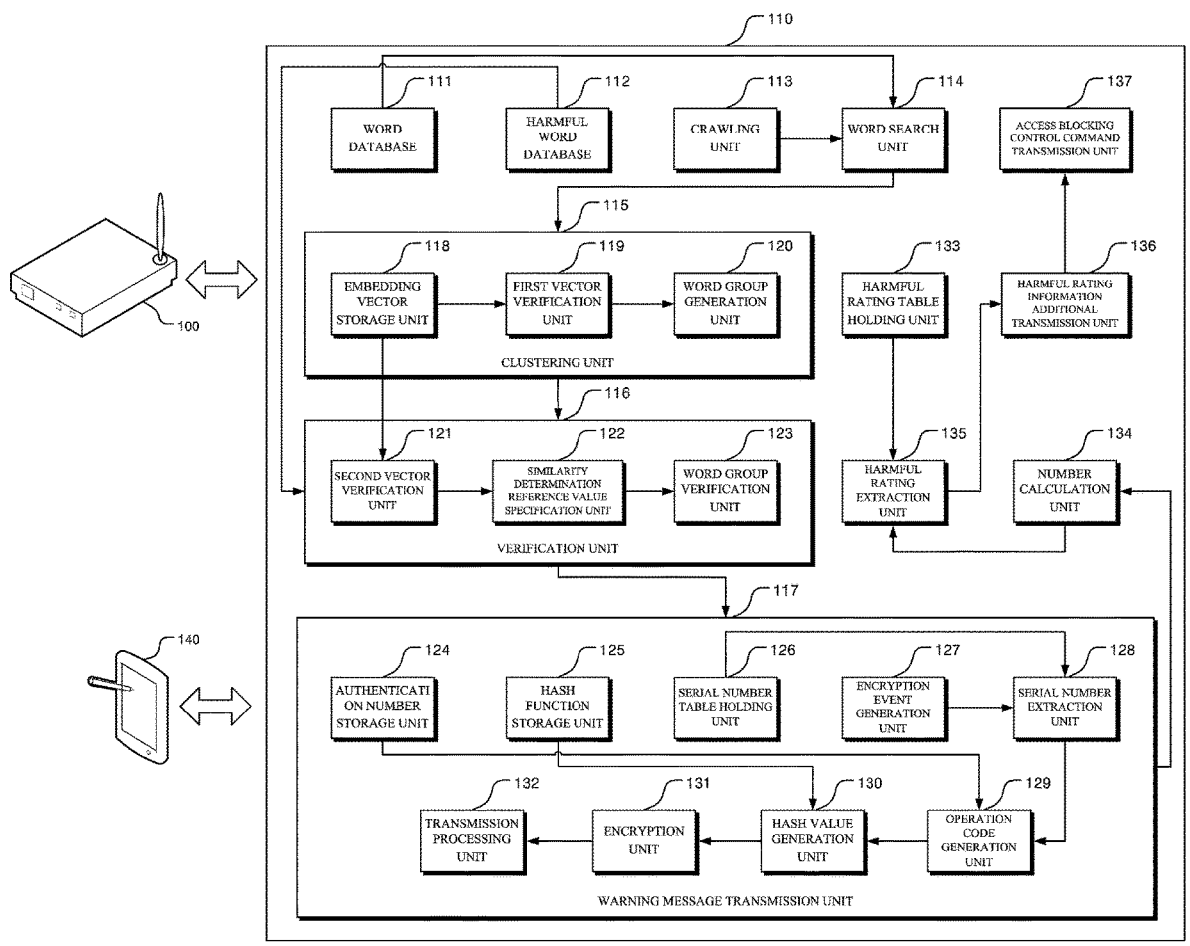
FIG. 1 is a diagram illustrating a structure of a notification service server capable of providing an access notification service to harmful sites according to an embodiment of the present invention.

Hereinafter, embodiments of the present invention will be described in detail with reference to the accompanying drawings. The description does not limit the present invention to specific embodiments, and it should be understood that the present invention covers all the modifications, equivalents and replacements included within the idea and technical scope of the present invention. In describing each drawing, like reference numerals refer to like elements and if not contrarily defined, all terms used herein including technological or scientific terms have the same meanings as those generally understood by a person with ordinary skill in the art.

In this document, unless explicitly described to the contrary, the word "comprise" and variations such as "comprises" or "comprising", will be understood to imply the inclusion of stated elements but not the exclusion of any other elements. Further, in various exemplary embodiments of the present invention, each of components, functional blocks or means may be constituted by one or more lower components and electrical, electronic, and mechanical functions performed by respective components may be implemented as various known devices or mechanical elements including an electronic circuit, an integrated circuit, an Application Specific Integrated Circuit (ASIC), etc., and the respective components may be separately implemented or two or more components may be integrated into one and implemented.

Meanwhile, blocks of the accompanying block diagram or steps of a flowchart may be appreciated as meaning computer program instructions mounted on a processor or a memory of data processible equipment such as a universal computer, a special computer, a portable notebook computer, a network computer, etc., and performing designated functions. Since the computer program instructions may be stored in a memory provided in a computer device or a computer readable memory, functions described in blocks of a block diagram or steps of a flowchart may be produced as a manufactured object including an instruction mean performing the functions. Moreover, each block or each step may represent a part of a module, a segment, or a code that includes one or more executable instructions for executing a specified logical function(s). It should also be noted that in some replaceable embodiments, the functions mentioned in the blocks or steps may also be executed differently from a predetermined order. For example, two blocks or steps that are subsequently illustrated are substantially simultaneously carried out, or may be performed in a reverse order, and in some cases, the functions may be performed while some blocks or steps are omitted.

FIG. 1 is a diagram illustrating a structure of a notification service server capable of providing an access notification service to harmful sites according to an embodiment of the present invention.

Referring to FIG. 1, the notification service server 110 according to the present invention includes a word database 111, a harmful word database 112, a crawling unit 113, a word search unit 114, a clustering unit 115, a verification unit 116, and a warning message transmission unit 117.

The word database 111 stores a plurality of different predetermined words.

For example, when a plurality of different predetermined words are referred to as 'word 1, word 2, word 3, . . . , word 50', the word database 111 may store the plurality of words 'word 1, word 2, Word 3, . . . , word 50'.

The harmful word database 112 stores a plurality of harmful words pre-selected among the plurality of words.

For example, it is assumed that among the plurality of words 'word 1, word 2, word 3, . . . , word 50', 'word 1, word 3, word 5, word 7, word 9, word 11, word 13, word 15', word 17, word 19, word 21, word 23, word 25, word 27, and word 29' are pre-selected as the plurality of harmful words, the harmful word database 112 may store the plurality of harmful words 'word 1, word 3, word 5, word 7, word 9, word 11, word 13, word 15, word 17, word 19, word 21, word 23, word 25, word 27, word 29'.

The selection of the harmful words stored in the harmful word database 112 may be performed in such a scheme that a manager directly selects words determined to be harmful word among the plurality of words, and also be performed by a scheme of applying and selecting the plurality of words to a deep learning model in which preliminary machine learning for determining whether the selected words are the harmful words is completed as an input.

When the crawling unit 113 receives access address information of a first site from router equipment 100 the terminal unique identification information of the client terminal as the client terminal currently connected to predetermined router equipment 100 accesses the first site, the crawling unit 113 accesses the first site based on the access address information of the first site, and then crawls a text posted on the accessed first site.

Here, the terminal unique identification information means a media access control (MAC) address, an Internet protocol (IP) address, an International mobile equipment identity or a telephone number allocated to the client terminal if the client terminal is a mobile terminal, etc.

When the text posted on the first site is crawled, the word search unit 114 searches the crawled text for words matching the plurality of words with reference to the word database 111.

First, it is assumed that the first side is '777JACKPOT', and as the client terminal currently connected to the predetermined router equipment 100 accesses the first site '777JACKPOT', the notification service sever 110 receives 'www.777jackpot.com' from the router equipment 100 as access address information of '777JACKPOT'' and an MAC address such as '1A:00:3F:F1:4C:C5' is received the terminal unique identification information of the client terminal.

Then, the crawling unit 113 may access '777JACKPOT' based on 'www.777jackpot.com' which is the access address information of '777JACKPOT', and then crawl a text posted on the accessed '777JACKPOT'.

As such, when the crawling unit 113 crawls the text posted on '777JACKPOT', the word search unit 114 may search words matching the plurality of words 'word 1, word 2, word 3, . . . , word 50' in the crawled text with reference to the word database 111.

When a plurality of first words are searched as the words matching the plurality of words in the crawled text, clustering unit 115 the plurality of first words are clustered into k (k is a natural number of 3 or more) word groups based on a semantic similarity between the plurality of first words.

In this case, according to an embodiment of the present invention, the clustering unit 115 may include an embedding vector storage unit 118, a first vector verification unit 119, and a word group generation unit 120.

The embedding vector storage unit 118 stores a predetermined embedding vector corresponding to each of the plurality of words.

Here, expressing the word in the form of a dense vector is called word embedding, and the dense vector is called an embedding vector, and word embedding methods include Word2Vec, FastText, and GloVe. In this case, the embedding vector corresponding to each of the plurality of words as a vector predetermined for each word based on a semantic similarity predetermined between the plurality of words is a vector specified so that a vector similarity between embedding vectors of two words is calculated to be high as the semantic similarity between two words is high.

For example, when a semantic similarity between 'word 1 and word 2' is higher than the semantic similarity between 'word 3 and word 50' among the plurality of words 'word 1, word 2, word 3, . . . , word 50', it may be specified so that the vector similarity between embedding vectors of 'word 1 and word 2', respectively is calculated to be higher than the vector similarity between embedding vectors of 'word 3 and word 50', respectively.

By such a scheme, the embedding vector corresponding to each of the plurality of words 'word 1, word 2, word 3, . . . , word 50' may be specified so that as the correlation between two words increases, the vector similarity between the embedding vectors of two words is calculated to be high.

In this regard, the embedding vector storage unit 118 may store information shown in Table 1 below.

TABLE 1

| Plurality of words | Embedding vector |
| --- | --- |
| Word 1 | $E_1$ |
| Word 2 | $E_2$ |
| Word 3 | $E_3$ |
| . . . | . . . |
| Word 50 | $E_{50}$ |

When the plurality of first words is searched as the words matching the plurality of words in the crawled text, the first vector verification unit 119 verifies embedding vectors corresponding to the plurality of first words, respectively by referring to the embedding vector storage unit 118.

The word group generation unit 120 performs K-means clustering for the plurality of first words based on the embedding vectors corresponding to the plurality of first words, respectively to generate k word groups.

Here, the K-means clustering which means an algorithm that combines data configured in the form of the vector into k groups is an algorithm that clusters data into k groups based on a distance of a centroid of a group to which data belongs and each data.

Hereinafter, operations of the first vector verification unit 119 and the word group generation unit 120 will be described in detail as an example.

First, it is assumed that k is '3', and the word search unit 114 searches the plurality of first words 'word 1, word 3, word 10, word 12, word 20, word 22, word 36, word 40, word 42' as the words matching the plurality of words 'word 1, word 2, word 3, . . . , word 50' in the crawled text.

Then, the first vector verification unit 119 may verify embedding vectors '$E_1, E_3, E_{10}, E_{12}, E_{20}, E_{22}, E_{36}, E_{40}, E_{42}$' corresponding to the plurality of first words 'word 1, word 3, word 10, word 12, word 20, word 22, word 36, word 40, word 42', respectively by referring to the embedding vector storage unit 118 shown in Table 1 above.

Then, the word group generation unit 120 performs the K-mean clustering for 'word 1, word 3, word 10, word 12, word 20, word 22, word 36, word 40, word 42' based on embedding vectors '$E_1, E_3, E_{10}, E_{12}, E_{20}, E_{22}, E_{36}, E_{40}, E_{42}$' corresponding to 'word 1, word 3, word 10, word 12, word 20, word 22, word 36, word 40, word 42', respectively to generate three word groups.

The verification unit 116 verifies whether there is a word group of which semantic similarity with the plurality of harmful words exceeds a predetermined reference similarity among k word groups.

In this case, according to an embodiment of the present invention, the verification unit 116 may include a second vector verification unit 121, a similarity determination reference value specification unit 122, and a word group verification unit 123.

The second vector verification unit 121 verifies a centroid vector corresponding to a centroid of each of k word groups, and verifies an embedding vector corresponding to each of the plurality of harmful words by referring to the embedding vector storage unit 118.

The similarity determination reference value specification unit 122 selects a maximum vector similarity as a similarity determination reference value corresponding to each of k word groups by computing a vector similarity between the centroid vector corresponding to the centroid of each of k word groups and the embedding vector corresponding to each of the plurality of harmful words.

Here, in order to compute the vector similarity, a cosine similarity or a Euclidean distance may be utilized.

The word group verification unit 123 verifies a word group in which a similarity determination reference value exceeds a predetermined threshold among k word groups as a word group in which the semantic similarity with the plurality of harmful words exceeds the reference similarity.

Hereinafter, the operations of the second vector verification unit 121, the similarity determination reference value specification unit 122, and the word group verification unit 123 will be described in detail as an example.

First, when the clustering unit 115 generates three word groups such as 'word group 1 (word 1, word 10, word 12), word group 2 (word 3, word 20, word 22), word group 3 (word 36, word 40, word 42)', the second vector verification unit 121 may verify a centroid vector corresponding to the centroid of each of 'word group 1, word group 2, word group 3'.

In this case, when the second vector verification unit 121 verifies that the centroid vectors corresponding to the centroids of 'word group 1, word group 2, word group 3', respectively are '$C_1, C_2, C_3$', the second vector verification unit 121 may verify embedding vectors '$E_1, E_3, E_5, E_7, E_9, E_{11}, E_{13}, E_{15}, E_{17}, E_{19}, E_{21}, E_{23}, E_{25}, E_{27}, E_{29}$' corresponding to the plurality of harmful words 'word 1, word 3, word 5, word 7, word 9, word 11, word 13, word 15, word 17, word 19, word 21, word 23, word 25, word 27, word 29', respectively by referring to the embedding vector storage unit 118 shown in Table 1 above.

Thereafter, the similarity determination reference value specification unit 122 selects the maximum vector similarity as the similarity determination reference value corresponding to each word group by computing the vector similarity between the centroid vectors '$C_1, C_2, C_3$' corresponding to the centroid of the word groups, respectively and the embedding vectors '$E_1, E_3, E_5, E_7, E_9, E_{11}, E_{13}, E_{15}, E_{17}, E_{19}, E_{21}, E_{23}, E_{25}, E_{27}, E_{29}$' corresponding to the plurality of harmful words 'word 1, word 3, word 5, word 7, word 9, word 11, word 13, word 15, word 17, word 19, word 21, word 23, word 25, word 27, word 29', respectively, for 'word group 1 (word 1, word 10, word 12), word group 2 (word 3, word 20, word 22), word group 3 (word 36, word 40, word 42)', respectively to specify the similarity determination reference values corresponding to 'word group 1, word group 2, word group 3, respectively.

In this regard, contents in which the similarity determination reference value specification unit 122 specifies the similarity determination reference value corresponding to 'word group 1 (word 1, word 10, word 12)' will be described in detail as follows. First, since the centroid vector corresponding to the centroid of 'word group 1' is '$C_1$', the similarity determination reference value specification unit 122 may compute the vector similarity between the centroid vector '$C_1$' corresponding to the centroid of 'word group 1' and the embedding vectors "$E_1, E_3, E_5, E_7, E_9, E_{11} E_{13}, E_{15}, E_{17}, E_{19}, E_{21}, E_{23}, E_{25}, E_{27}, E_{29}$' corresponding to the plurality of harmful words 'word 1, word 3, word 5, word 7, word 9, word 11, word 13, word 15, word 17, word 19, word 21, word 23, word 25, word 27, word 29', respectively, such as '$M_1, M_2, M_3, M_4, M_5, M_6, M_7, M_8, M_9, M_{10}, M_{11}, M_{12}, M_{13}, M_{14}, M_{15}$'. In this case, when it is assumed that the maximum vector similarity is '$M_1$' among the computed vector similarities '$M_1, M_2, M_3, M_4, M_5, M_6, M_7, M_8, M_9, M_{10}, M_{11}, M_{12}, M_{13}, M_{14}, M_{15}$', the similarity determination reference value specification unit 122 may specify the maximum vector similarity '$M_1$' as the similarity determination reference value corresponding to 'word group 1'.

Further, contents in which the similarity determination reference value specification unit 122 specifies the similarity determination reference value corresponding to 'word group 2 (word 3, word 20, word 22)' will be described in detail as follows. First, since the centroid vector corresponding to the centroid of 'word group 2' is 'C2', the similarity determination reference value specification unit 122 may compute the vector similarity between the centroid vector '$C_2$' corresponding to the centroid of 'word group 2' and the embedding vectors "$E_1, E_3, E_5, E_7, E_9, E_{11}, E_{13}, E_{15}, E_{17}, E_{19}, E_{21}, E_{23}, E_{25}, E_{27}, E_{29}$' corresponding to the plurality of harmful words 'word 1, word 3, word 5, word 7, word 9, word 11, word 13, word 15, word 17, word 19, word 21, word 23, word 25, word 27, word 29', respectively, such as '$M_{16}, M_{17}, M_{18}, M_{19}, M_{20}, M_{21}, M_{22}, M_{23}, M_{24}, M_{25}, M_{26}, M_{27}, M_{28}, M_{29}, M_{30}$'. In this case, when it is assumed that the maximum vector similarity is '$M_{17}$' among the computed vector similarities '$M_{16}, M_{17}, M_{18}, M_{19}, M_{20}, M_{21}, M_{22}, M_{23}, M_{24}, M_{25}, M_{26}, M_{27}, M_{28}, M_{29}, M_{30}$', the similarity determination reference value specification unit 122 may specify the maximum vector similarity '$M_{17}$' as the similarity determination reference value corresponding to 'word group 2'.

Last, in this regard, contents in which the similarity determination reference value specification unit 122 specifies the similarity determination reference value corresponding to 'word group 3 (word 36, word 40, word 42)' will be described in detail as follows. First, since the centroid vector corresponding to the centroid of 'word group 3' is '$C_3$', the similarity determination reference value specification unit 122 may compute the vector similarity between the centroid vector '$C_3$' corresponding to the centroid of 'word group 3' and the embedding vectors "$E_1, E_3, E_5, E_7, E_9, E_{11}, E_{13}, E_{15}, E_{17}, E_{19}, E_{21}, E_{23}, E_{25}, E_{27}, E_{29}$' corresponding to the plurality of harmful words 'word 1, word 3, word 5, word 7, word 9, word 11, word 13, word 15, word 17, word 19, word 21, word 23, word 25, word 27, word 29', respectively, such as '$M_{31}, M_{32}, M_{33}, M_{34}, M_{35}, M_{36}, M_{37}, M_{38}, M_{39}, M_{40}, M_{41}, M_{42}, M_{43}, M_{44}, M_{45}$'. In this case, when it is assumed that the maximum vector similarity is '$M_{45}$' among the computed vector similarities '$M_{31}, M_{32}, M_{33}, M_{34}, M_{35}, M_{36}, M_{37}, M_{38}, M_{39}, M_{40}, M_{41}, M_{42}, M_{43}, M_{44}, M_{45}$', the similarity determination reference value specification unit 122 may specify the maximum vector similarity '$M_{45}$' as the similarity determination reference value corresponding to 'word group 3'.

As such, when the similarity determination reference value specification unit 122 specifies the similarity determination reference values '$M_1, M_{17}, M_{45}$' corresponding to 'word group 1 (word 1, word 10, word 12), word group 2 (word 3, word 20, word 22), word group 3 (word 36, word 40, word 42)', respectively, the word group verification unit 123 may verify the word group for which similarity determination reference value exceeds a predetermined threshold among 'word group 1, word group 2, word group 3' as a word group which the semantic similarity to the plurality of harmful words 'word 1, word 3, word 5, word 7, word 9, word 11, word 13, word 15, word 17, word 19, word 21, word 23, word 25, word 27, word 29' exceeds the reference similarity.

In this regard, when it is assumed that the similarity determination reference value '$M_1$' corresponding to 'word group 1 (word 1, word 10, word 12)' and the similarity determination reference value '$M_{17}$' corresponding to 'word group 2 (word 3, word 20, word 22)' exceed the threshold, the word group verification unit 123 may verify 'word group 1 and word group 2' as the word group which the semantic similarity to the plurality of harmful words 'word 1, word 3, word 5, word 7, word 9, word 11, word 13, word 15, word 17, word 19, word 21, word 23, word 25, word 27, word 29' exceeds the reference similarity.

When it is verified that there is at least one word group as the word group of which semantic similarity with the plurality of harmful words among k word groups exceeds the reference similarity, the warning message transmission unit 117 determines that a situation in which the client terminal attempts to access the harmful site occurs, and then transmits a warning message for notifying that the client terminal attempts to access the harmful site while transmitting the terminal unique identification information of the client terminal to a predetermined manager terminal 140.

Here, the harmful site means a site containing information that is deemed required for review, such as security risks, gambling, obscenity, illegal drug sales, etc.

For example, as in the above-described example, it is assumed that the verification unit 116 verifies that there are one or more word groups 'word group 1 and word group 2' as the word group of which semantic similarity with the plurality of harmful words 'word 1, word 3, word 5, word 7, word 9, word 11, word 13, word 15, word 17, word 19, word 21, word 23, word 25, word 27, word 29' exceeds the reference similarity among 'word group 1 (word 1, word 10, word 12)', 'word group 2 (word 3, word 20, word 22)', word group 3 (word 36, word 40, word 42).

Then, the warning message transmission unit 117 may determine that a situation in which the client terminal attempts to access the harmful site occurs, and then transmit a warning message for notifying that the client terminal attempts to access the harmful site while transmitting the terminal unique identification information '1A:00:3F:F1: 4C:C5' of the client terminal to a predetermined manager terminal 140.

According to an embodiment of the present invention, when transmission of the warning message to the manager terminal 140 is completed, the notification service server 110 may specify that words belonging to at least one word group are new harmful words and additionally store the corresponding words in the harmful word database 112.

According to an embodiment of the present invention, when the warning message transmission unit 117 transmits the terminal unique identification information of the client terminal and the warning message to the manager terminal 140, the warning message transmission unit 117 may encrypt and transmit the terminal unique identification information of the client terminal to the manager terminal 140 in order to prevent the terminal unique identification information of the client terminal from being exposed to the other person.

In this regard, according to an embodiment of the present invention, the warning message transmission unit 117 may include an authentication number storage unit 124, a hash function storage unit 125, a serial number table holding unit 126, an encryption event generation unit 127, a serial number extraction unit 128, an operation code generation unit 129, a hash value generation unit 130, an encryption unit 131, and a transmission processing unit 132 as a specific configuration for encrypting and transmitting the terminal unique identification information of the client terminal to the manager terminal 140.

The authentication number storage unit 124 stores an authentication number of t (t is a natural number of 2 or more) digits, which is pre-shared with the manager terminal 140.

For example, when t is '4' and an authentication number of 4 digits is '1230', the authentication number storage unit 124 may store the authentication number '1230'.

The hash function storage unit 125 stores a predetermined hash function pre-shared with the manager terminal 140.

The serial number table holding unit 126 stores and holds a serial number table in which serial numbers of different t digits are recorded, which correspond to a plurality of predetermined time zones, respectively, which are pre-shared with the manager terminal 140.

For example, as in the above-described example, when t is '4', the serial number table holding unit 126 may store and hold a serial number table shown in Table 2 below.

TABLE 2

| Plurality of time zones | Serial numbers of 4 digits |
|---|---|
| Time zone 1 (0 a.m. to 4 a.m.) | 6401 |
| Time zone 2 (4 a.m. to 8 a.m.) | 3286 |
| Time zone 3 (8 a.m. to 12 p.m.) | 1752 |
| Time zone 4 (12 p.m. to 4 p.m.) | 5429 |
| ... | ... |

The encryption event generating unit 127 generates an encryption event for encrypting and transmitting the terminal unique identification information of the client terminal when it is determined that the situation in which the client terminal attempts to access the harmful site occurs.

When the encryption event is generated, the serial number extraction unit 128 extracts a first serial number corresponding to a first time zone to which a time point when the encryption event occurs belongs from the serial number table.

When the first serial number is extracted, the operation code generation unit 129 constitutes a result value when performing a modulo-2 operation for each of t numbers constituting the authentication number by bitstreams to generate a first operation code of t bits and constitutes a result value when performing the modulo-2 operation for each of t numbers constituting the first serial number by the bitstreams to generate a second operation code of t bits.

Here, the modulo-2 operation means an operation that performs a division of dividing a dividend by 2 to calculate a remainder therefor.

The first hash value generation unit 130 performs an XOR operation between the first operation code and the second operation code to generate a t-bit seed code, and then applies the seed code to the hash function as an input to generate a first hash value.

When the first hash value is generated, the encryption unit 131 encrypts the terminal unique identification information of the client terminal with the first hash value to generate first encryption information.

When the first encryption information is generated, the transmission processing unit 132 transmits the warning message to the manager terminal 140 while transmitting the first encryption information.

Hereinafter, the operations of the encryption event generation unit 127, the serial number extraction unit 128, the operation code generation unit 129, the hash value generation unit 130, the encryption unit 131, and the transmissions processing unit 132 will be described in detail as an example.

First, assume that it is determined that the situation in which the client terminal attempts to access the harmful site occurs.

Then, the encryption event generating unit 127 may generate an encryption event for encrypting and transmitting '1A:00:3F:F1:4C:C5' which is the terminal unique identification information of the client terminal.

As such, when the encryption event generation unit 127 generates the encryption event, the serial number extraction unit 128 may verify a time point when the encryption event is generated. When the time point of generating the encryption event is '3:30 p.m. on Apr. 14, 2022', the serial number extraction unit 128 may extract, from the serial number table shown in Table 2 above, '5429' which is the serial number corresponding to 'time zone 4 (12 p.m. to 4 p.m.)' to which '3:30 p.m. on Apr. 14, 2022' as the time point of generating the encryption event belong, as a first serial number.

Then, the operation code generation unit 129 constitutes a result value when performing the modulo-2 operation for each of 4 numbers constituting the authentication number '1230' by the bitstreams to generate a first operation code of 4 bits like '1010' and constitutes a result value when performing the modulo-2 operation for each of 4 numbers constituting '5429' which is the first serial number by the bitstreams to generate a second operation code of 4 bits like '1001'.

Then, the hash value generation unit 130 performs the XOR operation between the '1010' which is the first operation code and '1001' which is the second operation code to generate a seed code of 4 bits like '0011'.

Then, the hash value generation unit 130 applies '0011' which is the seed code to the hash function as the input to generate a first hash value such as '26d103c620a31345ag57qat327891703'.

As such, when the first hash value is generated by the hash value generating unit 130, the encryption unit 131 encrypts '1A:00:3F:F1:4C:C5' which is the terminal unique identification information of the client terminal with the first hash value '26d103c620a31345ag57qat327891703' to generate 'encryption information 1'.

As such, when 'encryption information 1' is generated by the encryption unit 131, the transmission processing unit 132 may transmit 'encryption information 1' and the warning message to the manager terminal 140.

In this case, according to an embodiment of the present invention, the manager terminal 140 pre-stores the authentication number, the hash function, and the serial number table on a memory, extracts the first serial number corresponding to the first time zone to which a time point of receiving the first encryption information and the warning message belongs from the serial number table when receiving the first encryption information and the warning message from the notification service server 110, and then constitutes a result value when performing the modulo-2 operation for each of t numbers constituting the authentication number by the bitstreams to generate the first operation code of t bits and constitutes a result value when performing the modulo-2 operation for each of t numbers constituting the first serial number by the bitstreams to generate the second operation code of t bits, and then performs the XOR operation between the first operation code and the second operation code to generate the seed code of t bits, applies the seed code to the hash function as the input to generate the first hash value, and then decodes the first encryption information with the first hash value to restore the terminal unique identification information of the client terminal and display the warning message on a screen jointly with the terminal unique identification information of the client terminal.

Hereinafter, the operation of the manager terminal 140 will be described in detail as an example.

First, as in the above-described example, it is assumed that t is '4', and '1230' which is the authentication number, and the hash function pre-shared with the notification service server 110, and the serial number table shown in Table 2 above are pre-stored on the memory of the manager terminal 140. Further, as in the above-described example, it is assumed that as the transmission processing unit 132 transmits 'encryption information 1' and the warning message to the manager terminal 140, the manager terminal 140 receives 'encryption information 1' and the warning message from the notification service server 110.

Then, the manager terminal 140 may verify that the time point when 'encryption information 1' and the warning message are received. Here, when the time point of receiving 'encryption information 1' and the warning message is '3:31 p.m. on Apr. 14, 2022', the manager terminal 140 may extract, from the serial number table shown in Table 2 above, '5429' which is the serial number corresponding to 'time zone 4 (12 p.m. to 4 p.m.)' to which '3:31 p.m. on Apr. 14, 2022' as the time point of receiving 'encryption information 1' and the warning message belong, as a first serial number.

Then, the manager terminal 140 constitutes a result value when performing the modulo-2 operation for each of 4 numbers constituting the authentication number '1230' by the bitstreams to generate a first operation code of 4 bits like '1010' and constitutes a result value when performing the modulo-2 operation for each of 4 numbers constituting '5429' which is the first serial number by the bitstreams to generate a second operation code of 4 bits like '1001'.

Thereafter, the manager terminal 140 performs the XOR operation between the '1010' which is the first operation code and '1001' which is the second operation code to generate a seed code of 4 bits like '0011'.

Then, the manager terminal 140 applies the seed code '0011' to the hash function as the input to generate the first hash value '26d103c620a31345ag57qat327891703', and then decodes 'encryption information 1' with the first hash value '26d103c620a31345ag57qat327891703' to restore '1A:00:3F:F1:4C:C5' which is the terminal unique identification information of the client terminal and display the warning message on the screen jointly with '1A:00:3F:F1:4C:C5' which is the terminal unique identification information of the client terminal.

According to an embodiment of the present invention, the notification service server 110 may further include a harmful rating table holding unit 133, a number calculation unit 134, a harmful rating extraction unit 135, and a harmful rating information additional transmission unit 136, and an access blocking control command transmission unit 137.

The harmful rating table holding unit 133 stores and holds a harmful rating table plurality of predetermined harmful ratings, and a predetermined range value for the number of word groups corresponding to the plurality of harmful ratings, respectively are recorded.

For example, the harmful rating table holding unit 133 may store and hold a harmful rating table shown in Table 3 below.

TABLE 3

| Plurality of harmful ratings | range value for the number of word groups |
|---|---|
| Rating 3 (normal) | One or more and less than two |
| Rating 2 (bad) | Two or more and less than three |
| Rating 1 (very bad) | Three or more |

The number calculation unit 134 calculates the number of words groups in which the similarity determination reference value exceeds threshold among k word groups after the terminal unique identification information of the client terminal and the warning message are transmitted to the manager terminal 140 through the warning message transmission unit 117.

The harmful rating extraction unit 135 extracts, from the harmful rating table, a first harmful rating recorded to correspond to a range value to which the calculated number belongs.

The harmful rating information additional transmission unit 136 additionally transmits information on the first harmful rating to the manager terminal 140 when the first harmful rating is extracted.

When the access blocking control command transmission unit 137 compares the first harmful rating and a predetermined reference rating, and determines that the first harmful rating exceeds the reference rating, the access blocking control command transmission unit 137 transmits an access blocking control command for instructing to perform Internet access blocking to the client terminal to the router equipment 100.

Hereinafter, the operations of the number calculation unit 134, the harmful rating extraction unit 135, the harmful rating information additional transmission unit 136, and the access blocking control command transmission unit 137 will be described in detail as an example.

First, as in the above-described example, it is assumed that '1A:00:3F:F1:4C:C5' which is the terminal unique identification information of the client terminal and the warning message are transmitted to the manager terminal 140 through the warning message transmission unit 117.

Then, the number calculation unit 134 may calculate the number of word groups in which the similarity determination reference value exceeds the threshold among 'word group 1 (word 1, word 10, word 12)', word group 2 (word 3, word 20, word 22), word group 3 (word 36, word 40, word 42)'.

In this regard, when it is assumed that '$M_1$' which is the similarity determination reference value corresponding to 'word group 1' and '$M_{17}$' which is the similarity determination reference value corresponding to 'word group 2' exceed the threshold, the number calculation unit 134 may calculate the number of word groups in which the similarity determination reference value exceeds the threshold among 'word group 1', word group 2, and word group 3' as '2'.

Then, the harmful rating extraction unit 135 may extract, as a first harmful rating, 'rating 2 (bad)' which is the harmful rating recorded to correspond to 'two or more and less than three' which is a range value to which the calculated number 'two' belongs from the harmful rating table shown in Table 3 above.

As such, when the harmful rating extraction unit 135 extracts 'rating 2 (bad)' which is the first harmful rating, the harmful rating information additional transmission unit 136 may additionally transmit information 'rating 2 (bad)' to the manager terminal 140.

Thereafter, the access blocking control command transmission unit 137 may compare 'rating 2 (bad)' and a predetermined reference rating.

When it is assumed that the predetermined reference rating is 'rating 3 (normal)', the access blocking control command transmission unit 137 determines that the first harmful rating 'rating 2 (bad)' exceeds the reference rating 'rating 3 (normal)' to transmit an access blocking control command for instructing to perform Internet access blocking to the client terminal to the router equipment 100.

In this case, when the router equipment 100 receives the access blocking control command from the notification service server 110, the router equipment 100 may perform the Internet access blocking to the client terminal.

FIG. 2 is a flowchart illustrating an operating method of a notification service server capable of providing an access notification service to harmful sites according to an embodiment of the present invention.

In step S210, a word database storing a plurality of predetermined different words is held.

In step S220, a harmful word database storing a plurality of harmful words pre-selected among the plurality of words is held.

In step S230, when access address information of a first site and the terminal unique identification information of the client terminal are received from router equipment as a client terminal currently connected to predetermined router equipment accesses the first site, the first site is accessed based on the access address information of the first site, and then a text posted on the accessed first site is crawled.

In step S240, when the text posted on the first site is crawled, words matching the plurality of words in the crawled text is searched with reference to the word database.

In step S250, when a plurality of first words are searched as the words matching the plurality of words in the crawled text, the plurality of first words are clustered into k (k is a natural number of 3 or more) word groups based on a semantic similarity between the plurality of first words.

In step S260, it is verified whether there is a word group of which semantic similarity with the plurality of harmful words exceeds a predetermined reference similarity among k word groups.

In step S270, when it is verified that there is at least one word group as the word group of which semantic similarity with the plurality of harmful words exceeds a reference similarity among k word groups, it is determined that a situation in which the client terminal attempts to access the harmful site occurs, and then transmits a warning message for notifying that the client terminal attempts to access the harmful site while transmitting the terminal unique identification information of the client terminal to a predetermined manager terminal.

In this case, according to an embodiment of the present invention, step S250 may include holding an embedding vector storage unit storing a predetermined embedding vector corresponding to each of the plurality of words, (wherein the embedding vector corresponding to each of the plurality of word as a vector predetermined for each word based on a semantic similarity predetermined between the plurality of words is a vector specified so that a vector similarity between embedding vectors of two words is calculated to be high as the semantic similarity between two words is high), when the plurality of first words is searched as the words matching the plurality of words in the crawled text, verifying embedding vectors corresponding to the plurality of first words, respectively by referring to the embedding vector storage unit, and performing K-means clustering for the plurality of first words based on the embedding vectors corresponding to the plurality of first words, respectively to generate k word groups.

In this case, according to an embodiment of the present invention, step S260 may include verifying a centroid vector corresponding to a centroid of each of k word groups, and verifies an embedding vector corresponding to each of the plurality of harmful words by referring to the embedding vector storage unit, selecting a maximum vector similarity as a similarity determination reference value corresponding to each of k word groups by computing a vector similarity between the centroid vector corresponding to the centroid of each of k word groups and the embedding vector corresponding to each of the plurality of harmful words, and verifying a word group in which a similarity determination reference value exceeds a predetermined threshold among k word groups as a word group in which the semantic similarity with the plurality of harmful words exceeds the reference similarity.

Further, according to an embodiment of the present invention, step S270 may include holding an authentication number storage unit storing an authentication number of t (t is a natural number of 2 or more) digits, which is pre-shared with the manager terminal, holding a hash function storage unit storing a predetermined hash function pre-shared with the manager terminal, storing and holding a serial number table in which serial numbers of different t digits are recorded, which correspond to a plurality of predetermined time zones, respectively, which are pre-shared with the manager terminal, generating an encryption event for encrypting and transmitting the terminal unique identification information of the client terminal when it is determined that the situation in which the client terminal attempts to access the harmful site occurs, extracting, when the encryption event is generated, a first serial number corresponding to a first time zone to which a time point when the encryption event is generated belongs from the serial number table, constituting, when the first serial number is extracted, a result value when performing a modulo-2 operation for each of t numbers constituting the authentication number by bitstreams to generate a first operation code of t bits and constituting a result value when performing the modulo-2 operation for each of t numbers constituting the first serial number by the bitstreams to generate a second operation code of t bits, performing an XOR operation between the first operation code and the second operation code to generate a t-bit seed code, and then applying the seed code to the hash function as an input to generate a first hash value, when the first hash value is generated, encrypting the terminal unique identification information of the client terminal with the first hash value to generate first encryption information, and when the first encryption information is generated, transmitting the warning message to the manager terminal while transmitting the first encryption information.

In this case, the manager terminal may pre-store the authentication number, the hash function, and the serial number table on a memory, extract the first serial number corresponding to the first time zone to which a time point of receiving the first encryption information and the warning message belongs from the serial number table when receiving the first encryption information and the warning message from the notification service server, and then constitute a result value when performing the modulo-2 operation for each of t numbers constituting the authentication number by the bitstreams to generate the first operation code of t bits and constitutes a result value when performing the modulo-2 operation for each of t numbers constituting the first serial number by the bitstreams to generate the second operation code of t bits, and then perform the XOR operation between the first operation code and the second operation code to generate the seed code of t bits, applies the seed code to the hash function as the input to generate the first hash value, and then decode the first encryption information with the first hash value to restore the terminal unique identification information of the client terminal and display the warning message on a screen jointly with the terminal unique identification information of the client terminal.

Further, according to an embodiment of the present invention, the operating method of a notification service sever may further include: storing and holding the harmful rating table a plurality of predetermined harmful ratings, and a predetermined range value for the number of word groups corresponding to the plurality of harmful ratings, respectively are recorded; calculating the number of words groups in which the similarity determination reference value exceeds the threshold among k word groups after the terminal unique identification information of the client terminal and the warning message are transmitted to the manager terminal; extracting, from the harmful rating table, a first harmful rating recorded to correspond to a range value to which the calculated number belongs; additionally transmitting information on the first harmful rating to the manager terminal when the first harmful rating is extracted; and when comparing the first harmful rating and a predetermined reference rating, and determining that the first harmful rating exceeds the reference rating, transmitting an access blocking control command for instructing the client terminal to perform Internet access blocking to the router equipment.

Hereinabove, the operating method of the notification service server according to an embodiment of the present invention has been described with reference to FIG. 2. Here, since the operating method for the notification service server according to an embodiment of the present invention may correspond to the configuration of the operation of the notification service server 110 described by using FIG. 1, a more detailed description thereof will be omitted.

The operating method for the notification service server capable of providing the access notification service to harmful sites according to an embodiment of the present invention may be implemented by a computer program stored in a storage medium for executing the computer program through coupling with a computer.

Further, the operating method of the Internet access management service server capable of providing an Internet access management service based on terminal grouping according to an embodiment of the present invention may be implemented in a program command type which may be performed through various computer means and recorded in a computer readable medium. The computer readable medium may include a program command, a data file, a data structure, etc., singly or combinationally. The program command recorded in the medium may be specially designed and configured for the present invention, or may be publicly known to and used by those skilled in the computer software field. An example of the computer readable recording medium includes magnetic media, such as a hard disk, a floppy disk, and a magnetic tape, optical media such as a CD-ROM and a DVD, magneto-optical media such as a floptical disk, and hardware devices such as a ROM, a RAM, and a flash memory, which are specially configured to store and execute the program command. An example of the program command includes a high-level language code executable by a computer by using an interpreter and the like, as well as a machine language code created by a compiler.

As described above, the present invention has been described by specified matters such as detailed components, and the like and limited exemplary embodiments and drawings, but the description is just provided to assist more overall understanding of the present invention and the present invention is not limited to the exemplary embodiment and various modifications and changes can be made by those skilled in the art from such a disclosure.

Accordingly, the spirit of the present invention should not be defined only by the described exemplary embodiments, and it should be appreciated that claims to be described below and all things which are equivalent to the claims or equivalently modified to the claims are included in the scope of the spirit of the present invention.

What is claimed is:

1. A notification service server capable of providing an access notification service to harmful sites, comprising a processor configured to:

hold a word database storing a plurality of predetermined different words;

hold a harmful word database storing a plurality of harmful words pre-selected among the plurality of words;

when receiving access address information of a first site and terminal unique identification information of a client terminal from router equipment as a client terminal currently connected to predetermined router equipment accesses the first site, access the first site based on the access address information of the first site, and then crawl a text posted on the accessed first site;

when the text posted on the first site is crawled, search words matching the plurality of words in the crawled text with reference to the word database;

when a plurality of first words are searched as the words matching the plurality of words in the crawled text, cluster the plurality of first words into k (k is a natural number of 3 or more) word groups based on a semantic similarity between the plurality of first words;

verify whether there is a word group of which semantic similarity with the plurality of harmful words exceeds a predetermined reference similarity among k word groups; and when it is verified that there is at least one word group as the word group of which semantic similarity with the plurality of harmful words exceeds a reference similarity among k word groups, determine that a situation in which the client terminal attempts to access the harmful site occurs, and then transmit a warning message for notifying that the client terminal attempts to access the harmful site while transmitting the terminal unique identification information of the client terminal to a predetermined manager terminal, wherein the processor is further configured to:

hold an authentication number storage unit storing an authentication number of t (t is a natural number of 2 or more) digits, which is pre-shared with the manager terminal, hold a hash function storage unit storing a predetermined hash function pre-shared with the manager terminal;

store and hold a serial number table in which serial numbers of different t digits are recorded, which correspond to a plurality of predetermined time zones, respectively, which are pre-shared with the manager terminal;

generate an encryption event for encrypting and transmitting the terminal unique identification information of the client terminal when it is determined that the situation in which the client terminal attempts to access the harmful site occurs;

extract, when the encryption event is generated, a first serial number corresponding to a first time zone to which a time point when the encryption event is generated belongs from the serial number table;

constitute, when the first serial number is extracted, a result value when performing a modulo-2 operation for each of t numbers constituting the authentication number by bitstreams to generate a first operation code of t bits and constituting a result value when performing the modulo-2 operation for each of t numbers constituting the first serial number by the bitstreams to generate a second operation code of t bits;

perform an XOR operation between the first operation code and the second operation code to generate a t-bit seed code, and then applying the seed code to the hash function as an input to generate a first hash value;

when the first hash value is generated, encrypt the terminal unique identification information of the client terminal with the first hash value to generate first encryption information; and when the first encryption information is generated, transmit the warning message to the manager terminal while transmitting the first encryption information, wherein the manager terminal pre-stores the authentication number, the hash function, and the serial number table on a memory, extracts the first serial number corresponding to the first time zone to which a time point of receiving the first encryption information and the warning message belongs from the serial number table when receiving the first encryption information and the warning message from the notification service server, and then constitutes a result value when performing the modulo-2 operation for each of t numbers constituting the authentication number by the bitstreams to generate the first operation code of t bits and constitutes a result value when performing the modulo-2 operation for each of t numbers constituting the first serial number by the bitstreams to generate the second operation code of t bits, and then performs the XOR operation between the first operation code and the second operation code to generate the seed code of t bits, applies the seed code to the hash function as the input to generate the first hash value, and then decodes the first encryption information with the first hash value to restore the terminal unique identification information of the client terminal and display the warning message on a screen jointly with the terminal unique identification information of the client terminal.

2. The notification service server of claim 1, wherein the processor is further configured to:

hold an embedding vector storage unit storing a predetermined embedding vector corresponding to each of the plurality of words, wherein the embedding vector corresponding to each of the plurality of word as a vector predetermined for each word based on a semantic similarity predetermined between the plurality of words is a vector specified so that a vector similarity between embedding vectors of two words is calculated to be high as the semantic similarity between two words is high, when the plurality of first words is searched as the words matching the plurality of words in the crawled text, verify embedding vectors corresponding to the plurality of first words, respectively by referring to the embedding vector storage unit, and perform K-means clustering for the plurality of first words based on the embedding vectors corresponding to the plurality of first words, respectively to generate k word groups.

3. The notification service server of claim 2, wherein the processor is further configured to:

verify a centroid vector corresponding to a centroid of each of k word groups, and verifies an embedding vector corresponding to each of the plurality of harmful words by referring to the embedding vector storage unit, select a maximum vector similarity as a similarity determination reference value corresponding to each of k word groups by computing a vector similarity between the centroid vector corresponding to the centroid of each of k word groups and the embedding vector corresponding to each of the plurality of harmful words, and verify a word group in which a similarity determination reference value exceeds a predetermined threshold among k word groups as a word group in which the semantic similarity with the plurality of harmful words exceeds the reference similarity.

4. The notification service server of claim 3, wherein the processor is further configured to:

store and hold a harmful rating table in which a plurality of predetermined harmful ratings, and predetermined range values for the number of word groups corresponding to the plurality of harmful ratings, respectively are recorded;

calculate the number of words groups in which the similarity determination reference value exceeds the threshold among k word groups after the terminal unique identification information of the client terminal and the warning message are transmitted to the manager terminal through;

extract, from the harmful rating table, a first harmful rating recorded to correspond to a range value to which the calculated number belongs;

additionally transmit information on the first harmful rating to the manager terminal when the first harmful rating is extracted; and when comparing the first harmful rating and a predetermined reference rating, and determining that the first harmful rating exceeds the reference rating, transmit an access blocking control command for instructing the client terminal to perform Internet access blocking to router equipment.

5. An operating method of a notification service server capable of providing an access notification service to harmful sites, comprising:

holding a word database storing a plurality of predetermined different words;

holding a harmful word database storing a plurality of harmful words pre-selected among the plurality of words;

when receiving access address information of a first site and terminal unique identification information of a client terminal from router equipment as a client terminal currently connected to predetermined router equipment accesses the first site, accessing the first site based on the access address information of the first site, and then crawling a text posted on the accessed first site;

when the text posted on the first site is crawled, searching words matching the plurality of words in the crawled text with reference to the word database;

when a plurality of first words are searched as the words matching the plurality of words in the crawled text, clustering the plurality of first words into k (k is a natural number of 3 or more) word groups based on a semantic similarity between the plurality of first words;

verifying whether there is a word group of which semantic similarity with the plurality of harmful words exceeds a predetermined reference similarity among k word groups; and when it is verified that there is at least one word group as the word group of which semantic similarity with the plurality of harmful words exceeds a reference similarity among k word groups, determining that a situation in which the client terminal attempts to access the harmful site occurs, and then transmitting a warning message for notifying that the client terminal attempts to access the harmful site while transmitting the terminal unique identification information of the client terminal to a predetermined manager terminal, wherein the transmitting of the warning message comprises:

holding an authentication number storage unit storing an authentication number of t (t is a natural number of 2 or more) digits, which is pre-shared with the manager terminal;

holding a hash function storage unit storing a predetermined hash function pre-shared with the manager terminal;

storing and holding a serial number table in which serial numbers of different t digits are recorded, which correspond to a plurality of predetermined time zones, respectively, which are pre-shared with the manager terminal;

generating an encryption event for encrypting and transmitting the terminal unique identification information of the client terminal when it is determined that the situation in which the client terminal attempts to access the harmful site occurs;

extracting, when the encryption event is generated, a first serial number corresponding to a first time zone to which a time point when the encryption event is generated belongs from the serial number table;

constituting, when the first serial number is extracted, a result value when performing a modulo-2 operation for each of t numbers constituting the authentication number by bitstreams to generate a first operation code of t bits and constituting a result value when performing the modulo-2 operation for each of t numbers constituting the first serial number by the bitstreams to generate a second operation code of t bits;

performing an XOR operation between the first operation code and the second operation code to generate a t-bit seed code, and then applying the seed code to the hash function as an input to generate a first hash value;

when the first hash value is generated, encrypting the terminal unique identification information of the client terminal with the first hash value to generate first encryption information; and when the first encryption information is generated, transmitting the warning message to the manager terminal while transmitting the first encryption information, wherein the manager terminal pre-stores the authentication number, the hash function, and the serial number table on a memory, extracts the first serial number corresponding to the first time zone to which a time point of receiving the first encryption information and the warning message belongs from the serial number table when receiving the first encryption information and the warning message from the notification service server, and then constitutes a result value when performing the modulo-2 operation for each of t numbers constituting the authentication number by the bitstreams to generate the first operation code of t bits and constitutes a result value when performing the modulo-2 operation for each of t numbers constituting the first serial number by the bitstreams to generate the second operation code of t bits, and then performs the XOR operation between the first operation code and the second operation code to generate the seed code of t bits, applies the seed code to the hash function as the input to generate the first hash value, and then decodes the first encryption information with the first hash value to restore the terminal unique identification information of the client terminal and display the warning message on a screen jointly with the terminal unique identification information of the client terminal.

6. The operating method of a notification service server of claim 5, wherein the clustering includes holding an embedding vector storage unit storing a predetermined embedding vector corresponding to each of the plurality of words, wherein the embedding vector corresponding to each of the plurality of word as a vector predetermined for each word based on a semantic similarity predetermined between the plurality of words is a vector specified so that a vector similarity between embedding vectors of two words is calculated to be high as the semantic similarity between two words is high, when the plurality of first words is searched as the words matching the plurality of words in the crawled text, verifying embedding vectors corresponding to the plurality of first words, respectively by referring to the embedding vector storage unit, and performing K-means clustering for the plurality of first words based on the embedding vectors corresponding to the plurality of first words, respectively to generate k word groups.

7. The operating method of a notification service server of claim 6, wherein the verifying of whether there is the word group includes verifying a centroid vector corresponding to a centroid of each of k word groups, and verifies an embedding vector corresponding to each of the plurality of harmful words by referring to the embedding vector storage unit, selecting a maximum vector similarity as a similarity determination reference value corresponding to each of k word groups by computing a vector similarity between the centroid vector corresponding to the centroid of each of k word groups and the embedding vector corresponding to each of the plurality of harmful words, and verifying a word group in which a similarity determination reference value exceeds a predetermined threshold among k word groups as a word group in which the semantic similarity with the plurality of harmful words exceeds the reference similarity.

8. The operating method of a notification service server of claim 7, further comprising:

storing and holding a harmful rating table in which a plurality of predetermined harmful ratings, and predetermined range values for the number of word groups corresponding to the plurality of harmful ratings, respectively are recorded;

calculating the number of words groups in which the similarity determination reference value exceeds the threshold among k word groups after the terminal unique identification information of the client terminal and the warning message are transmitted to the manager terminal;

extracting, from the harmful rating table, a first harmful rating recorded to correspond to a range value to which the calculated number belongs;

additionally transmitting information on the first harmful rating to the manager terminal when the first harmful rating is extracted; and when comparing the first harmful rating and a predetermined reference rating, and determining that the first harmful rating exceeds the reference rating, transmitting an access blocking control command for instructing the client terminal to perform Internet access blocking to router equipment.

9. A non-transitory computer readable recording medium having a program recorded therein for allowing a computer to execute an operating method of a notification service server capable of providing an access notification service to harmful sites, comprising:

holding a word database storing a plurality of predetermined different words;

holding a harmful word database storing a plurality of harmful words pre-selected among the plurality of words;

when receiving access address information of a first site and terminal unique identification information of a client terminal from router equipment as a client terminal currently connected to predetermined router equipment accesses the first site, accessing the first site based on the access address information of the first site, and then crawling a text posted on the accessed first site;

when the text posted on the first site is crawled, searching words matching the plurality of words in the crawled text with reference to the word database;

when a plurality of first words are searched as the words matching the plurality of words in the crawled text, clustering the plurality of first words into k (k is a natural number of 3 or more) word groups based on a semantic similarity between the plurality of first words;

verifying whether there is a word group of which semantic similarity with the plurality of harmful words exceeds a predetermined reference similarity among k word groups; and when it is verified that there is at least one word group as the word group of which semantic similarity with the plurality of harmful words exceeds a reference similarity among k word groups, determining that a situation in which the client terminal attempts to access the harmful site occurs, and then transmitting a warning message for notifying that the client terminal attempts to access the harmful site while transmitting the terminal unique identification information of the client terminal to a predetermined manager terminal, wherein the transmitting of the warning message comprises:

holding an authentication number storage unit storing an authentication number of t (t is a natural number of 2 or more) digits, which is pre-shared with the manager terminal;

holding a hash function storage unit storing a predetermined hash function pre-shared with the manager terminal;

storing and holding a serial number table in which serial numbers of different t digits are recorded, which correspond to a plurality of predetermined time zones, respectively, which are pre-shared with the manager terminal;

generating an encryption event for encrypting and transmitting the terminal unique identification information of the client terminal when it is determined that the situation in which the client terminal attempts to access the harmful site occurs;

extracting, when the encryption event is generated, a first serial number corresponding to a first time zone to which a time point when the encryption event is generated belongs from the serial number table;

constituting, when the first serial number is extracted, a result value when performing a modulo-2 operation for each of t numbers constituting the authentication number by bitstreams to generate a first operation code of t bits and constituting a result value when performing the modulo-2 operation for each of t numbers constituting the first serial number by the bitstreams to generate a second operation code of t bits;

performing an XOR operation between the first operation code and the second operation code to generate a t-bit seed code, and then applying the seed code to the hash function as an input to generate a first hash value;

when the first hash value is generated, encrypting the terminal unique identification information of the client terminal with the first hash value to generate first encryption information; and when the first encryption information is generated, transmitting the warning message to the manager terminal while transmitting the first encryption information, wherein the manager terminal pre-stores the authentication number, the hash function, and the serial number table on a memory, extracts the first serial number corresponding to the first time zone to which a time point of receiving the first encryption information and the warning message belongs from the serial number table when receiving the first encryption information and the warning message from the notification service server, and then constitutes a result value when performing the modulo-2 operation for each of t numbers constituting the authentication number by the bitstreams to generate the first operation code of t bits and constitutes a result value when performing the modulo-2 operation for each of t numbers constituting the first serial number by the bitstreams to generate the second operation code of t bits, and then performs the XOR operation between the first operation code and the second operation code to generate the seed code of t bits, applies the seed code to the hash function as the input to generate the first hash value, and then decodes the first encryption information with the first hash value to restore the terminal unique identification information of the client terminal and display the warning message on a screen jointly with the terminal unique identification information of the client terminal.

* * * * *